United States Patent
Stark et al.

(10) Patent No.: US 7,037,085 B1
(45) Date of Patent: May 2, 2006

(54) DUAL GEAR SINGLE OUTLET MATERIAL PUMP AND METHOD OF CONSTRUCTING SUCH A PUMP

(76) Inventors: Patricia A. Stark, 12567 SW. Pembrooke Cir. North, Lake Suzy, FL (US) 34269; Jon Zook, 8101 Country Rd. #104, Ft. Myers, FL (US) 33919

( * ) Notice: Subject to any disclaimer, the term of this patent is extended or adjusted under 35 U.S.C. 154(b) by 97 days.

(21) Appl. No.: 10/724,675

(22) Filed: Dec. 1, 2003

Related U.S. Application Data

(63) Continuation-in-part of application No. 10/378,183, filed on Mar. 3, 2003, now Pat. No. 6,823,653.

(51) Int. Cl.
*F01C 1/063* (2006.01)

(52) U.S. Cl. ............... 417/63; 417/313; 418/9
(58) Field of Classification Search .......... 417/63, 417/313; 418/206.1, 5, 7, 8, 9, 15
See application file for complete search history.

(56) References Cited

U.S. PATENT DOCUMENTS

| | | | | |
|---|---|---|---|---|
| 3,493,036 A | * | 2/1970 | Weed et al. | 165/64 |
| 3,922,117 A | * | 11/1975 | Weatherston | 418/9 |
| 4,009,974 A | * | 3/1977 | Scholl | 418/181 |
| 6,210,138 B1 | * | 4/2001 | Cortez | 418/132 |

* cited by examiner

*Primary Examiner*—Charles G. Freay
(74) *Attorney, Agent, or Firm*—Edward P. Dutkiewicz

(57) ABSTRACT

A dual gear, single outlet material pump includes a base plate, a lower gear plate and two associated gears, a spacer plate, an idler shaft, a drive shaft, an upper drive gear, and an upper gear plate. An upper idler gear is housed within a tri-lobed aperture of an upper gear plate. A plurality of screw holes are through a top plate. A plurality of heating plates are coupled to the sides of the assembled pump and a plurality of temperature sensors are coupled to the recesses in the spacer plate. An outlet manifold couples with each of the outlets of the lower gear plate and the upper gear plate to form a single outlet. The method of construction produces an easily disassembled, cleaned, and re-assembled pump.

7 Claims, 3 Drawing Sheets

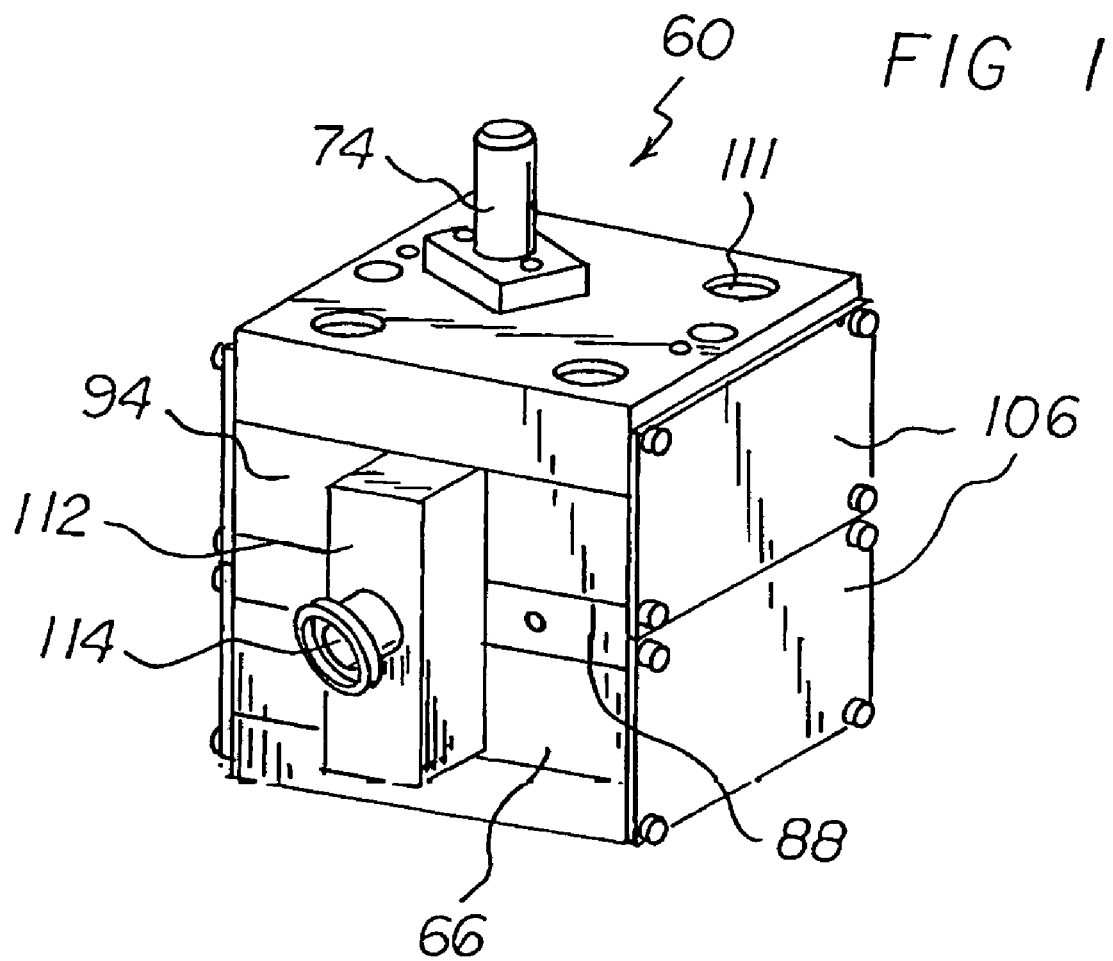

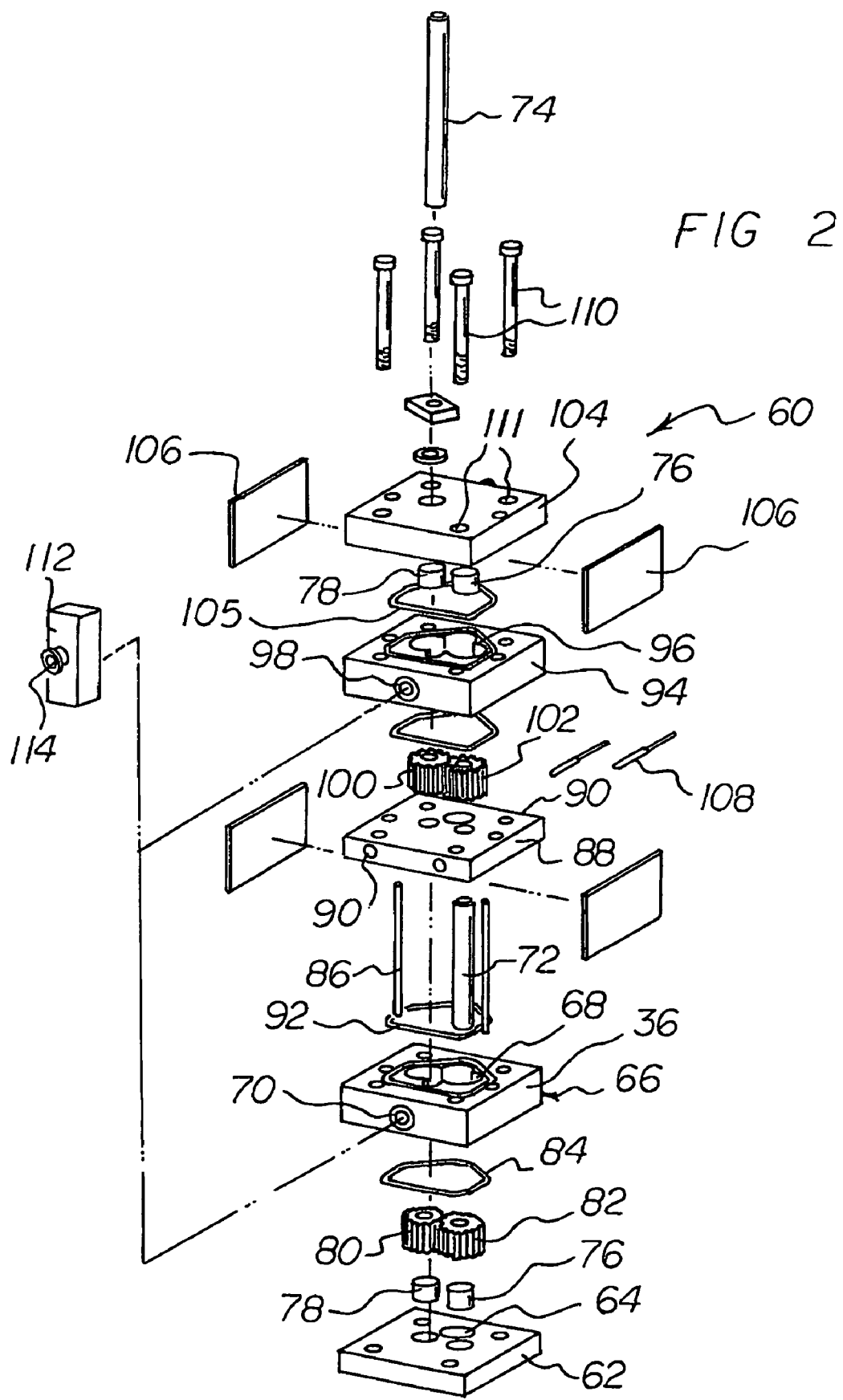

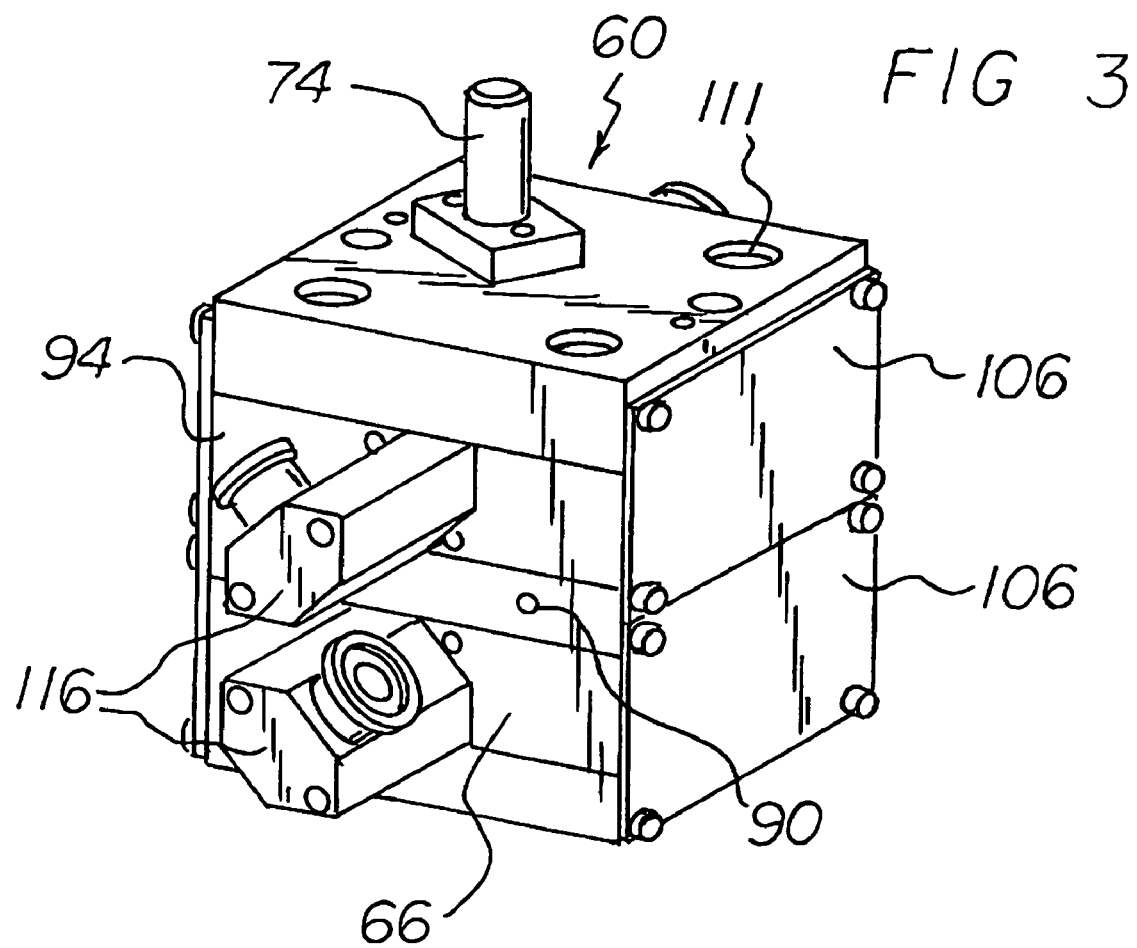

DUAL GEAR SINGLE OUTLET MATERIAL PUMP AND METHOD OF CONSTRUCTING SUCH A PUMP

RELATED BACKGROUND

This application is a division of a patent application filed concurrently herewith entitled Pressurized Sanitary Precision Polymer film Casting and Dispersion Injection System and Method of Construction a Pressurized Sanitary Precision Polymer Film Casting and Dispersion Injection System which is a Continuation-in-Part Application of application Ser. No. 10/378,183, filed on Mar. 3, 2003 now U.S. Pat. No. 6,823,653.

BACKGROUND OF THE INVENTION

1. Field of the Invention

The present invention relates to a dual gear, single outlet material pump and more particularly pertains to a pump that enables a user to provide an equal parallel pump outflow and the method of constructing such a pump.

2. Description of the Prior Art

The use of material pumps of known configurations and designs is known in the prior art. More specifically, material pumps of known configurations and designs previously devised and utilized for the purpose of moving material through a system are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,209,989 B1 issued to Silverbrook on Apr. 3, 2001 discloses a ink injecting pump having thermal activation. U.S. Pat. No. 6,159,442 issued to Thumm et al on Dec. 12, 2000 discloses a multiple stream high pressure mixer/reactor. Lastly, U.S. Pat. No. 6,083,566 issued to Whitesell on Jul. 4, 2000 discloses a substrate handling and processing system and method.

While these devices fulfill their respective, particular objectives and requirements, the aforementioned patents do not describe dual gear, single outlet material pump that enables a user to provide an equal parallel outflow from the pump.

In this respect, the dual gear, single outlet material pump according to the present invention substantially departs from the conventional concepts and designs of the prior art, and in doing so provides an apparatus primarily developed for the purpose of enabling a user to provide an equal parallel outflow from the pump.

Therefore, it can be appreciated that there exists a continuing need for a new and improved dual gear, single outlet material pump which can be used for enabling a user to provide an equal parallel pump outflow. In this regard, the present invention substantially fulfills this need.

SUMMARY OF THE INVENTION

In view of the foregoing disadvantages inherent in the known types of material pumps of known configurations and designs now present in the prior art, the present invention provides an improved dual gear, single outlet material pump. As such, the general purpose of the present invention, which will be described subsequently in greater detail, is to provide a new and improved dual gear, single outlet material pump which has all the advantages of the prior art and none of the disadvantages.

To attain this, the present invention essentially comprises a dual gear, single outlet material pump. The pump enables a user to provide an equal parallel outflow from the pump. The pump comprises several components in combination. First provided is a rectilinear base plate. The base plate has an upper surface and a lower surface. Between the upper surface and the lower surface is a side edge. The side edge has a thickness there between. The base plate has an inflow opening there through. The upper surface of the base plate has a plurality of pin recesses and threaded screw recesses. The upper surface of the base plate also has an idler bearing recess and a drive shaft bearing recess there in.

Next provided is a lower gear plate. The lower gear plate has a rectilinear configuration with an upper surface and a lower surface. Between the upper surface and the lower surface of the lower gear plate is a side edge. The side edge has a thickness there between. The lower gear plate has a tri-lobed aperture there through with each of the lobes having a first diameter. The lower gear plate has an outlet on the edge. The outlet communicates with the tri-lobed aperture. Next provided is a pair of lower gears being a drive gear and an idler gear. Each gear has an external second diameter, with each of the gears having a shaft hole there through. The shaft hole has a third diameter, with the second diameter being slightly less than the first diameter and the second diameter being greater than the third diameter. The gears are housed within the tri-lobed aperture of the lower gear plate.

Next provided is a lower pair of associated shaft bearings. There is one bearing for each of the shafts. Next provided is a seal that is located between the base plate and the lower gear plate. Next provided is a pair of alignment pins. Next provided is a spacer plate. The spacer plate has an upper surface and a lower surface and a side edge, having a thickness, there between. The spacer plate has a plurality of pin holes and a plurality of shaft holes there through. The spacer plate also has a material flow hole, a plurality of bolt holes, and a plurality of alignment pin holes there through. The spacer plate side edge has a plurality of temperature sensor recesses there into. Next provided is a seal located between the lower gear plate and the spacer plate.

Next provided is an idler shaft having a third diameter and sized to be firmly received by the idler gear. The shaft passes through a shaft hole in the spacer plate and the shaft hole of the lower idler gear. Next provided is an upper gear plate. The upper gear plate has a rectilinear configuration with an upper surface and a lower surface with a side edge having a thickness there between. The upper gear plate has a tri-lobed aperture there through. Each of the lobes has a first diameter. The upper gear plate has an outlet on the edge. The outlet communicates with the tri-lobed aperture.

Next provided is a pair of upper gears being a drive gear and an idler gear. Each gear has a external second diameter, with each of the gears having a shaft hole there through. The shaft hole has a third diameter. The gears are housed within the tri-lobed aperture of the upper gear plate. Next provided is an upper pair of associated shaft bearings. There is one bearing for each of the shafts. Next provided is a top plate. The top plate has an upper surface and a lower surface with a side edge having a thickness there between. The lower surface of the top plate has a plurality of pin recesses. The top plate has an idler shaft bearing recess therein. The top plate has a drive shaft bearing hole there through. The top plate also has a plurality of screw holes there through. Next provided is a seal that is positioned between the top plate and the upper gear plate.

Next provided is plurality of heating plates. The heating plates are coupled to the sides of the assembled pump to provide heat to the pump and to the material as it passes through the pump. Next provided is a plurality of temperature sensors. The temperature sensors are coupled to the temperature sensor recesses. Next provided is a drive shaft. The drive shaft has an upper end and a lower end. The drive shaft is sized to pass through the drive gears and plates. The drive shaft is sized to be received by a lower bearing on the lower end and by an upper bearing on the upper end. Next provided is a plurality of bolts to couple the plates to each other. And lastly provided is a an outlet plate for coupling with each of the outlets of the lower gear plate and the upper gear plate to form a single outlet.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved dual gear, single outlet material pump which has all of the advantages of the prior art material pumps of known configurations and designs and none of the disadvantages.

It is another object of the present invention to provide a new and improved dual gear, single outlet material pump which may be easily and efficiently manufactured and marketed.

It is further object of the present invention to provide a new and improved dual gear, single outlet material pump which is of durable and reliable constructions.

An even further object of the present invention is to provide a new and improved dual gear, single outlet material pump which is susceptible of a low cost of manufacture with regard to both materials and labor, and which accordingly is then susceptible of low prices of sale to the consuming public, thereby making such dual gear, single outlet material pump economically available to the buying public.

Even still another object of the present invention is to provide a dual gear, single outlet material pump for enabling a user to provide an equal parallel outflow from the pump.

Lastly, it is an object of the present invention to provide a new and improved dual gear, single outlet material pump. The pump comprises several components, in combination.

A base plate has an inflow opening there through and a plurality recesses there in. A lower gear plate has a tri-lobed aperture communicating with an outlet. There are two gears, being a lower drive gear and a lower idler gear. The gears are housed within the tri-lobed aperture of the lower gear plate. There is a lower pair of associated shaft bearings. A spacer plate is coupled to the lower gear plate. The spacer plate has a plurality of holes there through and recesses there into. There is an idler shaft and a drive shaft that are located through several of the plates of the pump. The shafts are associated with the gears of the pump. An upper gear plate has a tri-lobed aperture communicating with an outlet. Within the upper gear plate is located an upper drive gear and an upper idler gear. The gears are housed within the tri-lobed aperture of the upper gear plate. There is an upper pair of associated shaft bearings. There is a top plate having a plurality recesses there in with a drive shaft bearing hole there through and a plurality of screw holes there through. A plurality of heating plates are coupled to the sides of the assembled pump to provide a source of heat for the material as it passes through the pump. A plurality of temperature sensors are coupled to the recesses in the spacer plate. A plurality of bolts couple the plates to each other. The pump has an outlet manifold for coupling with each of the outlets of the lower gear plate and the upper gear plate to form a single outlet.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side perspective view of the dual gear, single outlet pump.

FIG. 2 is a an exploded view of the dual gear, single outlet pump, with optional single outlet manifold.

FIG. 3 is side perspective of the dual gear, dual outlet pump.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved dual gear, single outlet material pump embodying the principles and concepts of the present invention and generally designated by the reference numeral 60 will be described.

The present invention, the dual gear, single outlet material pump 60 is comprised of a plurality of components. Such components in their broadest contet include a base plate, upper and lower gear plates, a spacer plate, a top plate and a plurality of shafts, gears, bolts and seals. Such compnents are individually configured and correlated with respect to each other so as to attain the desired objective. The pump enables a user to provide an equal parallel outflow from the pump. The pump comprises several components in combination. It should be noted that the term "dual gear" refers to the presence of two pairs of gears, being a drive gear and an idler gear. The drive and idler gears work together to produce a pumping action. A "single gear" pump has one pair of gears, being a drive gear and an idler gear.

First provided is a rectilinear base plate 62. The base plate has an upper surface and a lower surface. Between the upper surface and the lower surface is a side edge. The side edge has a thickness there between. The base plate has an inflow opening 64 there through. The upper surface of the base plate has a plurality of pin recesses and threaded screw recesses. The upper surface of the base plate also has an idler bearing recess and a drive shaft bearing recess there in.

Next provided is a lower gear plate 66. The lower gear plate has a rectilinear configuration with an upper surface and a lower surface. Between the upper surface and the lower surface of the lower gear plate is a side edge 36. The side edge has a thickness there between. The lower gear plate has a tri-lobed aperture 68 there through with each of the lobes having a first diameter. The lower gear plate has an outlet 70 on the edge. The outlet communicates with the tri-lobed aperture.

Next provided is a pair of lower gears being a drive gear 80 and an idler gear 82. Each gear has an external second diameter, with each of the gears having a shaft hole there through. The shaft hole has a third diameter, with the second diameter being slightly less than the first diameter and the second diameter being greater than the third diameter. The gears are housed within the tri-lobed aperture of the lower gear plate.

Next provided is a lower pair of associated shaft bearings. The is one bearing for each of the shafts, an idler bearing 76 for the idler shaft and a drive shaft bearing 78 for the drive shaft.

Next provided is a seal 84 that is located between the base plate and the lower gear plate.

Next provided is a pair of alignment pins 86.

Next provided is a spacer plate 88. The spacer plate has an upper surface and a lower surface and a side edge, having a thickness, there between. The spacer plate has a plurality of pin holes and a plurality of shaft holes there through. The spacer plate also has a material flow hole, a plurality of bolt holes, and a plurality of alignment pin holes there through. The spacer plate side edge has a plurality of temperature sensor recesses 90 there into.

Next provided is a seal 92 located between the lower gear plate and the spacer plate.

Next provided is an idler shaft 72 having a third diameter and sized to be firmly received by the idler gear. The shaft passes through a shaft hole in the spacer plate and the shaft hole of the lower idler gear.

Next provided is an upper gear plate 94. The upper gear plate has a rectilinear configuration with an upper surface and a lower surface with a side edge having a thickness there between. The upper gear plate has a tri-lobed aperture 96 there through. Each of the lobes has a first diameter. The upper gear plate has an outlet 98 on the edge. The outlet communicates with the tri-lobed aperture.

Next provided is a pair of upper gears being a drive gear 100 and an idler gear 102. Each gear has a external second diameter, with each of the gears having a shaft hole there through. The shaft hole has a third diameter. The gears are housed within the tri-lobed aperture of the upper gear plate.

Next provided is an upper pair of associated shaft bearings. There is one bearing for each of the shafts, an idler bearing 76 for the idler shaft and a drive shaft bearing 78 for the drive shaft.

Next provided is a top plate 104. The top plate has an upper surface and a lower surface with a side edge having a thickness there between. The lower surface of the top plate has a plurality of pin recesses. The top plate has an idler shaft bearing recess therein. The top plate has a drive shaft bearing hole there through. The top plate also has a plurality of screw holes there through.

Next provided is a seal 105 that is positioned between the top plate and the upper gear plate.

Next provided is plurality of heating plates 106. The heating plates are coupled to the sides of the assembled pump to provide heat to the pump and to the material as it passes through the pump.

Next provided is a plurality of temperature sensors 108. The temperature sensors are coupled to the temperature sensor recesses.

Next provided is a drive shaft 74. The drive shaft has an upper end and a lower end. The drive shaft is sized to pass through the drive gears and plates. The drive shaft is sized to be received by a lower bearing on the lower end and by an upper bearing on the upper end.

Next provided is a plurality of bolts 110 to couple the plates to each other.

And lastly provided is a an outlet manifold 112 for coupling with each of the outlets of the lower gear plate and the upper gear plate to form a single outlet 114.

In an alternate embodiment the pump may be configured with a dual outlet manifold so as to allow two outlets. Such a pump would be described as a dual gear, dual outlet pump. The pump would have a plurality of outlet manifolds 116 to provide material feed to a plurality of hoses.

In another alternate embodiment the pump may be configured as a single gear, single outlet pump. In that configuration there is only one gear plate, and the space plate is not employed. The single gear, single outlet pump has a top plate and a base plate and a gear plate with seals between the plates. A gear pair, referred to as a "single gear" comprises an idler shaft and a drive shaft. The pair of gears are employed in the single gear, single outlet pump having a idler and drive shaft which is shorter than the dual gear, single outlet pump shafts.

It should be noted that the pump as described utilizes what is described as plate technology, in that each component is plate-like to allow for easy disassembly, cleaning, and re-assembly. Material passageways, which envelope parts of the gears, are wide and easily cleaned. The ease of cleaning, inspection, and re-assembly makes the pump "validatable", meaning that the cleanliness of the pump can be proved by visual inspection of all surfaces, or swabs of all surfaces, before re-assembly.

Also disclosed is a method of constructing a pump utilizing plate technology. The method comprises several steps, in combination.

The first step comprises providing a base plate. The base plate has an inflow opening there through and a plurality recesses there in. The base plate has recesses to receive and contain shaft bearings.

The next step comprises providing a lower gear plate. The lower gear plate has a tri-lobed aperture communicating with an outlet. The lower gear plate is coupled to the base plate whereby material from the base plate may pass into the lower gear plate.

The next step comprises providing a lower drive gear and a lower idler gear. The gears are housed within the tri-lobed aperture of the lower gear plate. The gears provide the moving force to move material through the pump.

The next step comprises providing a lower pair of associated shaft bearings for the shafts to contact with, and ride in.

The next step comprises providing a spacer plate having a plurality of holes there through and recesses there into. The spacer plate is coupled to the lower gear plate. The use of the spacer plate allows the pump to function as a dual outlet pump with each gear assembly having a separate compartment within the respective gear plate.

The next step comprises providing an idler shaft and a drive shaft for coupling with the gears of the pump. The idler and drive shafts pass through the passageways of the spacer plate.

The next step comprises providing an upper gear plate having a tri-lobed aperture communicating with an outlet. Like the lower gear plate, the upper gear plate forms a housing for the material pumping gears.

The next step comprises providing an upper drive gear and an upper idler gear housed within the tri-lobed aperture of the upper gear plate. The gears are coupled to the idler and drive shafts. The upper plate gears, like the lower plate gears, provide a force to move material through the pump. Because the lower and upper gears are the same size, and turn at the same rate, the flow and pressure resulting at the outlets of the plates is the same. The rate of flow, and hence the delivery pressure may be controlled by the pump.

The next step comprises providing an upper pair of associated shaft bearings which are associated with the idler and drive shafts.

The next step comprises providing a top plate having a plurality recesses there in. The top plate has a drive shaft bearing hole there through and a plurality of screw holes there through. The top plate has a recess to receive and contain the idler shaft bearing.

The next step comprises providing a plurality of heating plates. The heating plates are coupled to the sides of the assembled pump. The heating plates are capable of providing heat to material as it moves through the pump.

The next step comprises providing a plurality of temperature sensors. The sensors are coupled to the recesses in the spacer plate. The sensors allow a user to determine pump temperature. The sensors are located within the spacer between the gear plates. This positioning provides an accurate measurement of material temperature as it moves through the pump.

The next step comprises providing a plurality of bolts to couple the plates to each other.

The last step is coupling, through an outlet manifold, each of the outlets of the lower gear plate and the upper gear plate to form a single outlet. In this manner, the components, when assembled, allow a user to have a dual gear, single outlet material pump which is easily disassembled, cleaned, and re-assembled.

In an alternate embodiment the pump may be assembled without the seals between the pump components. The pump may also be assembled with only one gear plate, with no use of a spacer plate. Such configuration would be considered to be a single gear, single outlet pump.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dual gear, single outlet material pump for enabling a user to provide an equal parallel outflow from the pump, comprising in combination:

a rectilinear base plate having an upper surface and a lower surface with a side edge and having a thickness there between with the base plate having an inflow opening there through, the upper surface of the base plate having a plurality of pin recesses and threaded screw recesses and an idler bearing recess and a drive shaft bearing recess there in;

a lower gear plate having a rectilinear configuration with an upper surface and a lower surface with a side edge and having a thickness there between, the lower gear plate having a tri-lobed aperture there through with each of the lobes having a first diameter, the lower gear plate having an outlet on the edge, the outlet communicating with the tri-lobed aperture;

a pair of lower gears being a drive gear and an idler gear, each gear having an external second diameter with each of the gears having a shaft hole there through, the shaft hole having a third diameter, with the second diameter being slightly less than the first diameter and the second diameter being greater than the third diameter, the gears being housed within the tri-lobed aperture of the lower gear plate;

a lower pair of associated shaft bearings, one for each of the shafts;

a seal being located between the base plate and the lower gear plate;

a pair of alignment pins;

a spacer plate having an upper surface and a lower surface and a side edge having a thickness there between, the spacer plate having a plurality of pin holes and a plurality of shaft holes and a material flow hole and a plurality of bolt holes and a plurality of alignment pin holes there through, the spacer plate side edge having a plurality of temperature sensor recesses there into;

a seal located between the lower gear plate and the spacer plate;

an idler shaft having a third diameter and sized to be firmly received by the idler gear, the shaft passing through a shaft hole in the spacer plate and the shaft hole of the lower idler gear;

an upper gear plate having a rectilinear configuration with an upper surface and a lower surface with a side edge having a thickness there between, the upper gear plate having a tri-lobed aperture there through with each of the lobes having a first diameter, the upper gear plate having an outlet on the edge, the outlet communicating with the tri-lobed aperture;

a pair of upper gears being a drive gear and an idler gear, each gear having a external second diameter with each of the gears having a shaft hole there through, the shaft hole having a third diameter, the gears being housed within the tri-lobed aperture of the upper gear plate;

an upper pair of associated shaft bearings, one for each of the shafts;

a top plate having an upper surface and a lower surface with a side edge having a thickness there between, the lower surface of the top plate having a plurality of pin recesses and an idler shaft bearing recess therein and a drive shaft bearing hole there through and, the top plate also having a plurality of screw holes there through;

a seal being positioned between the top plate and the upper gear plate;

a plurality of heating plates being coupled to the sides of the assembled pump to provide heat to the pump and the material as it passes through the pump;

a plurality of temperature sensors coupled to the temperature sensor recesses;

a drive shaft having an upper end and a lower end, the drive shaft being sized to pass through the drive gears and plates and to be received by a lower bearing on the lower end and an upper bearing on the upper end;

a plurality of bolts to couple the plates to each other; and the pump having an outlet plate for coupling with each of the outlets of the lower gear plate and the upper gear plate to form a single outlet.

2. A material pump, comprising in combination:

a base plate having an inflow opening there through;

at least one gear plate having a tri-lobed aperture communicating with an outlet;

at least one spacer plate, with the spacer plate having at least one temperature probe aperture therein;

at least one drive gear and at least one lower idler gear housed within the tri-lobed aperture of the gear plate;

an idler shaft and a drive shaft; and a top plate.

3. A material pump as described in claim 2 wherein the pump further comprises a plurality of seals located between the plates.

4. A material pump as described in claim 2 wherein the pump further comprises a plurality of alignment pins to align the components of the pump during assembly.

5. A material pump as described in claim 2 the pump further comprising:

a manifold having two separate outlets so that the pump is a dual outlet material pump.

6. A single gear, single outlet material pump for enabling a user to provide a continuous predetermined outflow from the pump, comprising in combination:

a rectilinear base plate having an upper surface and a lower surface with a side edge and having a thickness there between with the base plate having an inflow opening there through, the upper surface of the base plate having a plurality of pin recesses and threaded screw recesses and an idler bearing recess and a drive shaft bearing recess there in;

a gear plate having a rectilinear configuration with an upper surface and a lower surface with a side edge and having a thickness there between, the gear plate having a tri-lobed aperture there through with each of the lobes having a first diameter, the gear plate having an outlet on the edge, the outlet communicating with the tri-lobed aperture;

a pair of gears being a drive gear and an idler gear, each gear having an external second diameter with each of the gears having a shaft hole there through, the shaft hole having a third diameter, with the second diameter being slightly less than the first diameter and the second diameter being greater than the third diameter, the gears being housed within the tri-lobed aperture of the gear plate;

a lower pair of associated shaft bearings, one for each of the shafts;

a seal being located between the base plate and the gear plate;

a pair of alignment pins;

an idler shaft having a third diameter and sized to be firmly received by the idler gear, the shaft passing through the shaft hole of the idler gear;

an upper pair of associated shaft bearings, one for each of the shafts;

a top plate having an upper surface and a lower surface with a side edge having a thickness there between, the lower surface of the top plate having a plurality of pin recesses and an idler shaft bearing recess therein and a drive shaft bearing hole there through and, the top plate also having a plurality of screw holes there through and a drive shaft seal associated there with;

a seal being positioned between the top plate and the gear plate;

a plurality of heating plates being coupled to the sides of the assembled pump to provide heat to the pump and the material as it passes through the pump;

a plurality of temperature sensors coupled to the temperature sensor recesses;

a drive shaft having an upper end and a lower end, the drive shaft being sized to pass through the drive gear and to be received by a lower bearing on the lower end and an upper bearing on the upper end;

a plurality of bolts to couple the plates to each other; and the pump having a single outlet.

7. A method of constructing a dual gear, single outlet material pump, the method comprising, in combination:

providing a base plate having an inflow opening there through and a plurality recesses there in the base plate having recesses to receive and contain shaft bearings;

providing a lower gear plate having a tri-lobed aperture communicating with an outlet with the lower gear plate being coupled to the base plate;

providing a lower drive gear and a lower idler gear, the gears being housed within the tri-lobed aperture of the lower gear plate;

providing a lower pair of associated shaft bearings;

providing a spacer plate having a plurality of holes there through and recesses there into, the spacer plate being coupled to the lower gear plate;

providing an idler shaft and a drive shaft for coupling with the gears of the pump, the idler and drive shafts passing through the passageways of the spacer plate;

providing an upper gear plate having a tri-lobed aperture communicating with an outlet;

providing an upper drive gear and an upper idler gear housed within the tri-lobed aperture of the upper gear plate with the gears coupled to the idler and drive shafts;

providing an upper pair of associated shaft bearings;

providing a top plate having a plurality recesses there in with a drive shaft bearing hole there through and a plurality of screw holes there through, the top plate having recess to receive and contain the idler shaft bearings;

providing a plurality of heating plates being coupled to the sides of the assembled pump, the heating plates being capable of providing heat to material as it moves through the pump;

providing a plurality of temperature sensors coupled to the recesses in the spacer plate, the sensors allowing a user to determine pump temperature;

providing a plurality of bolts to couple the plates to each other; and providing an outlet manifold for coupling with each of the outlets of the lower gear plate and the upper gear plate to form a single outlet, the components when assembled allowing a user to have a dual gear, single outlet material pump which is easily disassembled, cleaned and re-assembled.

* * * * *